United States Patent Office 3,725,293
Patented Apr. 3, 1973

3,725,293
CONVERSION OF FUEL-METAL NITRATE SOLUTIONS TO OXIDES
Paul A. Haas, Knoxville, Tenn., assignor to the United States of America as represented by the United States Atomic Energy Commission
No Drawing. Filed Jan. 11, 1972, Ser. No. 217,038
Int. Cl. C01g 56/00
U.S. Cl. 252—301.1 R 9 Claims

ABSTRACT OF THE DISCLOSURE

A single-step method for converting an aqueous nuclear fuel metal nitrate solution to a fuel-metal oxide. A nitrate-reducing agent selected from the group consisting of hydroxylated organic compounds and hydrazine is added to the nitrate solution. The solution containing the additive is heated to an elevated temperature under pressure until the fuel-metal oxide is precipitated. The precipitated oxide then is recovered.

BACKGROUND OF THE INVENTION

This invention was made in the course of, or under, a contract with the United States Atomic Energy Commission.

Certain processes for the chemical reprocessing of nuclear reactor fuels require the conversion of aqueous solution of uranyl and/or plutonium nitrate to uranium and/or plutonium dioxide powders. The resulting oxide powder is pressed and sintered to form pellets suitable for use as reactor fuel. Thus, the process for converting the fuel-metal nitrate solutions to the corresponding fuel-metal oxide powder must accomplish the following: (1) reduce or oxidize the metal ion to the IV valence state; (2) remove nitrate and non-volatile impurities; and (3) form metal oxide particles suitable for fabrication into pellets suitable for use as reactor fuel. It is, of course, desirable that the conversion to the oxide be accomplished with minimum loss of the fuel metal.

Various conventional processes—such as thermal denitration and chemical precipitation—have been evaluated for the conversion of the fuel-metal nitrate solutions to the desired oxide powders. Certain chemical precipitation processes have been found to be generally suitable, but they require several process steps to accomplish the above-enumerated operations. For example, suitable fuel-metal dioxide powders can be obtained from aqueous uranyl nitrate solutions in four process steps comprising: (1) adding ammonium hydroxide to the nitrate solution to precipitate ammonium diuranate (ADU); (2) filtering and washing the precipitate to remove nitrate as ammonium nitrate; (3) firing the purified precipitate to convert it to the oxide and to hydrogen-reduce the uranium from valence state VI to IV; and (4) grinding and classifying the oxide to produce particles metting process specifications.

In general, conventional de-nitration processes are not highly suitable for the production of the desired fuel-metal oxide powder because the denitration product is the trioxide, which requires an additional reduction operation. Furthermore, it is not known if the characteristics of, say, co-denitrated plutonium-uranium oxides would be suitable for fabrication into fuel pellets of the kind desired. Flame de-nitration can be employed to produce the dioxide, but the resulting powder sinters poorly after pelletizing. Furthermore, the flame de-nitration process is difficult to scale up to large capacities.

SUMMARY OF THE INVENTION

It is, therefore, an object of this invention to provide a novel process for the conversion of aqueous fuel-metal nitrate solutions to fuel-metal dioxides.

It is another object to provide a nitrate-to-oxide conversion process wherein chemical reduction of the metal nitrate and precipitation of the metal dioxide are accomplished in a single process step.

It is another object to provide a novel process for the conversion of such nitrate solutions to fuel-metal dioxide slurries which can be filtered with relative ease.

Other objects of the invention will be made apparent hereinafter.

My invention can be summarized as follows: A method for converting an aqueous nuclear fuel metal nitrate solution to a fuel-metal oxide comprising the steps of (a) adding an aqueous-soluble nitrate-reducing material selected from the group consisting of hydroxylated organic compounds and hydrazine to said nitrate solution, (b) maintaining the resulting solution at an elevated temperature under pressure until said fuel-metal oxide is precipitated, and (c) recovering the precipitated fuel-metal oxide.

In my process the fuel-metal nitrate solution containing the reducing agent is maintained at an elevated temperature under pressure to reduce the fuel metal to the tetravalent state and, concurrently, to reduce the nitrate to volatile products. As a result, fuel-metal oxide is precipitated in a dehydrated and non-gelatinous form, and can be recovered with relative ease by filtration. The waste by-products of the reactions are volatile and thus easily removed. The fuel-metal oxide precipitate, when recovered and dried, is in the form of a free-flowing powder which can be pelletized without grinding. The product powder can be pelletized for use as nuclear reactor fuel or can be fabricated by any suitable technique into various ceramic articles, such as crucibles. Unlike some processes for the production of mixed fuel-metal oxides, this process does not require a preliminary adjustment of valences.

DESCRIPTION OF THE PREFERRED EMBODIMENT

The following is an illustration of my process as directed to the single-step conversion of aqueous uranyl nitrate solution to uranium dioxide, using hydrazine as a reducing agent. (As used therein, terms such as "uranium dioxide" and "plutonium-uranium dioxide" refer to oxides wherein the ratio of oxygen atoms to heavy metal atoms is not necessarily two but may approximate two.) An overall reaction for the single-step conversion using hydrazine can be summarized as follows (all valences of nitrogen from $N_2O_5$ to $NH_4^+$ might result):

$$UO_2(NO_3)_2 + 2N_2H_4 \cdot H_2O \rightarrow UO_2 + N_2 + 2N_2O + 6H_2O$$

EXAMPLE I

(Run PAR-13)

The single-step conversion to uranium dioxide was conducted in the boiling mode in a column-type reactor adapted for the continuous feed of the reactants and for continuous or batchwise removal of the product. The following is a brief description of the reactor and its controls.

The reactor was a 24-inch length of 4-inch stainless steel pipe having a tapered bottom section and provided at the top with a flange joint. The reactor was jacketed with a coil for conveying steam and with electrical resistance heaters. A water-cooled heat exchanger was close-coupled to the top of the reactor to receive gas and vapor therefrom. The heat exchanger was provided with a 270 p.s.i. rupture disc, a relief valve for controlling the gas pressure in the reactor, and gas-letdown valves. Temperatures were recorded by means of thermocouples. The bottom of the reactor was provided with a ball valve for the discharge of solution and slurry.

The general mode of operation was as follows. The rates of reaction and of gas production were controlled by regulating the rate of admission of one or both of the reactants. In this particular run, the aqueous uranyl nitrate solution was admitted batchwise. Metered quantities of the reducing agent (hydrazine) were fed into the reactor continuously. The relief valve was adjusted to permit the escape of gases when the pressure in the reactor exceeded a set value. The temperature of the reactant mixture was limited to the boiling point at the set pressure, heat being removed by condensing the vapors and returning the condensate to the reaction zone. For control purposes, a small heat input to the reactor was maintained until the reaction was considered essentially complete. The arrangement for filtering the product oxide slurry was not adapted for continuous operation; thus, the slurry was discharged from the reactor on a batch basis.

The operating conditions for the run were as follows. One liter of 1.25 M uranyl nitrate solution was admitted to the reactor, after which the reactor was pressurized initially with gaseous nitrogen. The solution then was heated under pressure to bring it to operating temperature. With the nitrate solution at a temperature in the range of 154 to 162° C., a total of 0.5 liter of 5.8 M $N_2H_4 \cdot H_2O$ was admitted to the reactor at a rate of 2 liters/hour. When gas evolution in the reactor had essentially ceased, the reactor heaters were turned off and the gases in the reactor were bled off. The pressure in the reactor was about 100 p.s.i.g. during the period (0.9 hour) from the time that the hydrazine solution was first introduced until the reactor heaters were de-energized. During this period the solution was at a temperature in the range of 154–165° C.

The product oxide was withdrawn from the reactor as a slurry and was filtered. Analysis of the supernate (pH, 7.65) showed it to contain less than 0.01% of the initial uranium. The concentration of $NO_3^-$ in the supernate was 0.85 M. The solid product from the filtration was dried at 300° C. in an argon atmosphere for about six hours. The resulting material was a fine, free-flowing black powder having a bulk density of 2.25 g./cc.; an oxygen-to-metal mole ratio of 2.44 (as determined by dissolution in phosphoric acid-urea and U-valence analyses); and a surface area of 23.1 m.²/g. (as determined by nitrogen gas absorption).

The dried oxide referred to above was fired at 460° C. for three hours, after which samples of the resulting material were pelletized at 7000 p.s.i.g., 10,000 p.s.i.g. or 15,000 p.s.i.g. The pellets were fired in a hydrogen atmosphere at either 1650° C. or 1750° C. for 45 minutes. The table (below) compares the densities of the fired pellets (identified as Sample PAR-13) with the densities of pellets (Sample 215) formed of so-called ceramic grade $UO_2$ used as a reference material.

TABLE

| Sample number | Source | Pelletizing pressure, 10³ p.s.i. | Pellet density, density of theoretical | |
|---|---|---|---|---|
| | | | 1,650° C. firing | 1,750° C. firing |
| 215 | Reference—Ceramic-grade $UO_2$. | 7 | 93.5 | 94.5 |
| | | | 92.0 | 94.3 |
| | | | 92.9 | ---- |
| | | 10 | 94.2 | 95.8 |
| | | | 94.3 | 95.9 |
| | | | 94.7 | ---- |
| | | 15 | 95.1 | 96.3 |
| | | | 94.9 | 96.0 |
| | | | 94.9 | ---- |
| PAR-13 | $UO_2$a | 7 | 91.9 | 91.6 |
| | | | 91.2 | 92.2 |
| | | | 91.7 | ---- |
| | | 10 | 91.9 | 94.1 |
| | | | 93.3 | 93.7 |
| | | | 93.4 | ---- |
| | | 15 | 94.0 | 94.5 |
| | | | 93.4 | 94.9 |
| | | | 94.5 | ---- |
| PAR-7 | $UO_2$-$CeO_x$a | 7 | 94.1 | 94.4 |
| | | | 94.2 | 94.6 |
| | | | 94.2 | ---- |
| | | 10 | 93.4 | 95.0 |
| | | | 94.8 | 94.8 |
| | | | 95.0 | ---- |
| | | 15 | 95.0 | 95.5 |
| | | | 94.9 | 95.4 |
| | | | 94.5 | ---- |
| PAR-18 | $UO_2$-$ThO_2$a | 7 | 85.2 | 87.0 |
| | | 10 | 87.3 | 89.6 |
| | | 15 | 89.7 | 91.5 |
| PAR-17 | $UO_2$-$ThO_2$b | 7 | 71.4 | 75.3 |
| | | 10 | 74.6 | 78.5 |
| | | 15 | 78.5 | 82.6 | a Using hydrazine reducing agent.
b Using ethylene glycol reducing agent.

EXAMPLE II

(Run PAR-7)

In this run, which was conducted in the system described in Example I, the nitrate solution comprised a mixture of uranyl nitrate and cerium nitrate, the latter serving as a chemical stand-in for plutonium ($Pu^{+4}$) nitrate. The mode of operation was similar to that employed in Example I. The reactor was charged initially with 0.2 liter of $H_2O$ and with 1.0 liter of solution that was 1.00 M U; 0.25 M Ce; and 3.48 M $NO_3^-$. With the nitrate solution at a temperature in the range of 158–177° C., a total of 0.5 liter of 8.4 M $N_2H_4 \cdot H_2O$ was fed into the reactor at a rate of 2 liters/hour. The time from the initial introduction of the hydrazine solution to shutoff of the reactor heaters was 0.8 hour. During this period the reactor pressure was in the range of 100–130 p.s.i.g. and the temperature of the solutions was in the range of 158–177° C.

The oxide precipitate was recovered by filtration. Analysis of the supernate (pH, 8.65) showed it to contain less than 0.01% of the initial uranium and less than 0.1% of the initial cerium. The $NO_3^-$ concentration was 0.76 M. The solid material obtained by filtration was dried by heating to 280° C. in argon. The dried material was a black powder having an oxygen-to-metal mole ratio of 2.36; a Ce/(Ce+U) mole ratio of 0.209; a surface area of 28.2 m.²/g.; and a carbon content of 0.036 wt. percent.

The dried mixed-oxide powder was fired at 460° C. for three hours, after which samples of the resulting material were pelletized and sintered as described in Example I. The resulting densities are shown (Sample PAR-7) in the table, above.

EXAMPLE III

(Run PAR-18)

This run was conducted in the reactor system described in Example I, the general mode of operation being the same as in that example. In this run, the reactor was charged initially with 1.1 liters of aqueous solution containing 1.0 mole U; 0.25 mole Th; and 2.97 moles of $NO_3^-$. With this solution at a temperature in the range of 148–157° C., a total of 0.5 liter of 7.0 M $N_2H_4 \cdot H_2O$ was added at the rate of 2 liters/hour. During the period (2 hours) from the initial admission of the hydrazine solution until shutoff of the reactor heaters, the reactor pressure was in the range of 100–110 p.s.i.g. and the solution temperature was in the range of 148–171° C.

The oxide precipitate was recovered by filtration. Analysis showed the supernate (pH, 7.75) to contain less than 0.1% of the initial uranium and less than 0.1% of the initial thorium. The $NO_3^-$ concentration was 0.57 M. The precipitate recovered by filtration was dried by heating to 390° C. in argon. The resulting material was a brownish-black powder having a bulk density of 1.88 g./cc.; an O/metal mole ratio of 2.33; a surface area of 42.7 m.$^2$/g.; and a carbon content of 0.054 wt. percent.

The dried mixed-oxide powder was fired at 460° C. for three hours. Samples of the fired material were pelletized and sintered as shown in the table (Run PAR–18). The densities of the sintered pellets are also shown.

EXAMPLE IV (Run PAR–17)

In this run, the mixed-nitrate aqueous solution comprised 80 mole percent uranium and 20 mole percent thorium, and the reducing agent was ethylene glycol. The run was conducted generally as in Example I, the specific operating conditions being as follows. The reactor was charged initially with 1.1 liters of aqueous solution containing 1.0 mole uranium; 0.25 mole Th; and 2.97 mole $NO_3^-$. With this solution at a temperature of 200–210° C., a total of 350 g. of ethylene glycol was metered into the reactor. During the period (1.2 hours) from the first addition of the glycol to shutoff of the reactor heaters, the reactor pressure was in the range of 200–220 p.s.i.g. and the reactor temperature was in the range of 200–215° C.

The mixed-oxide precipitate was recovered by filtration. The supernate (pH, 2.3) contained about 10% of the initial uranium and less than 0.1% of the initial thorium. The $NO_3^-$ concentration was 0.05 M. The solid material from the filtration was dried and fired at temperatures below 400° C. The fired oxide was a brown powder having a bulk density of 1.26 g./cc.; and O/metal mole ratio of 2.33; a Th/(U+Th) mole ratio of 0.221; a surface area of 48. g. m.$^2$/g.; and a carbon content of 0.34 wt. percent. The oxide was re-fired to 460° C. for three hours, pelletized, and sintered. The table (above) presents data on the density of the sintered pellets (Run PAR–17).

Runs analogous to those described in Examples I–IV were also conducted with ethyl alcohol as the reducing agent. Of the three reducing agents used in the column reactor, hydrazine was found to be the most effective reductant. When ethylene glycol and ethyl alcohol were used, temperatures above 200° C. and pressures of about 250 p.s.i.g. were required to satisfactorily precipitate uranium and cerium oxide mixtures. All things considered, hydrazine appears to be an especially suitable reducing agent for the preparation of $UO_2$ and of co-precipitated $UO_2$-$PuO_2$ for use as reactor fuel pellets. Ethylene glycol appears to be more suitable for the preparation of $PuO_2$ which is to be mechanically mixed with $UO_2$ before pelletization, since the less-dense and finer $PuO_2$ obtained with ethylene glycol favors uniform mixing and the formation of $UO_2$-$PuO_2$ solid solutions.

In conducting my process, I prefer to admit the reactants to the reaction zone continuously, so that the rate of reaction and the rate of gas production can be easily controlled by controlling the reactant feed rate. If desired, however, the process can be conducted on a batchwise basis. The following examples illustrate the process as conducted batchwise in a standard rocking autoclave having a volume of 13.3 liters, automatic temperature control, and a 25-cycles/min. rocking action.

EXAMPLE V (Run 127)

The autoclave was charged with 310 g. of ethyl alcohol (twice the stoichiometric requirement) and 2.0 liters of aqueous solution containing 1.2 g.-moles of $UO_2^{+2}$, 0.3 g.-mole of $Ce^{+4}$ as a stand-in for $Pu^{+4}$, and 4.15 g.-moles of $NO_3^-$. The autoclave then was pressurized with 90 p.s.i.g. of gaseous nitrogen. The autoclave then was heated to about 255° C. over a period of about 2½ hours, after which the temperature was maintained in the range of 252–264° C. for another 2½ hours. During heat-up, the reactor pressure increased to a value in the range of 900–1170 p.s.i.g. Temperature and pressure measurements indicated that most of the reaction occurred over a period of about an hour, at temperatures in the range of 90–160° C. The maximum temperature attained in the run was 264° C.

The product oxides were removed from the autoclave as a slurry, recovered by filtration, and dried in flowing argon to 250° C. Analysis of the supernate showed that it contained less than 0.1% of the initial uranium and less than 0.1% of the initial cerium. Analysis showed the dried mixed-oxide product to be 70.5% uranium and 10.2% cerium, with an O/U mole ratio of 2.39 and an O/(U+Ce) mole ratio of 2.31. The carbon content was 1.15%. The powder had a surface area of 16.3 m.$^2$/g. and a bulk density of 1.26 g./cc. The powder comprised generally rounded particles having a diameter on the order of one micron.

EXAMPLE VI (Run 133)

The above-mentioned autoclave was charged with 2 g.-moles of triethanolamine (three times the stoichiometric requirement) and 2.0 liters of aqueous solution containing 1.2 g.-moles of $UO_2^{+2}$; 0.3 g.-mole Ce; and 4.52 g.-moles $NO_3^-$. The autoclave was heated to 200° C. over a period of about 2 hours, and the temperature maintained at about that value for 2.7 hours. The reaction started at a temperature of 160° C., and the maximum temperature reached during the run was 202° C. The pressure in the autoclave increased to a maximum of 350 p.s.i.g. during the run.

The resulting mixed-oxide slurry was removed from the autoclave, filtered, and dried at 400° C. in flowing $CO_2$. Analysis of the supernate gave the following: pH, 4.1; 0.79 M $NO_3^-$; 0.0025 M Ce; 0.007 M U. The dried-oxide analysis was as follows: surface area, 22.4 m.$^2$/g.; O/U+Ce) mole ratio, 2.14; O/U mole ratio, 2.16; bulk density, 1.11; carbon, 1.62 wt. percent.

Additional runs were conducted in the autoclave to determine if other reducing agents could be used at elevated temperatures and pressures to effect single-step reduction-precipitation and produce an easily filtered slurry yielding a pelletizable oxide powder. In addition to the agents mentioned in Examples I–VI, the following were found to be effective: n-propanol, sugar (which was admitted to the nitrate solution as a solid), isoamyl alcohol, and n-butanol.

In the runs conducted in the autoclave, it was found that greater than 99% precipitation of both uranium and cerium was obtained when either the unreacted nitrate concentrations were less than 0.1 M or the pH of the product supernate was greater than 5. The alcohols with more than two carbon atoms left more unreacted nitrate than did ethylene glycol, ethanol, methanol, or sugar. Carbon residues were higher for the runs made with sugar. The most suitable hydrocarbon reducing agents were ethanol and ethylene glycol. It was noted that the compounds with an OH on each carbon (e.g., methanol and ethylene glycol), gave more complete reductions of $NO_3^-$ than n-propanol and higher alcohols. When hydrocarbon reducing agents were used, temperatures above about 200° C. were found necessary to precipitate at least 99% of the uranium and cerium. It was noted that the reactivity of the nitrate decreased as the pH increased.

Hydrazine was a more effective reducing agent in runs conducted in the semi-continuous reactor than in the runs which were conducted in the autoclave. In the autoclave runs, the hydrazine did not reduce the nitrate as completely, and the oxide precipitate was less easily filtered. It is believed that these effects were due to the hydrazine being combined with the nitrate solution at room temperature, for at temperatures below about 120° C. hydrazine acts as a base only. In the previously described runs conducted in the column reactor (Examples I, II, and III) the hydrazine was admitted at reactor temperatures—e.g., 177° C.—at which it functioned more effectively as a reducing agent. If desired, the hydrazine may be admitted at still higher reactor temperatures.

Referring to my process more generally, single-step conversion of pressurized aqueous fuel-metal nitrate solutions to fuel-metal oxides can be accomplished conveniently in the boiling mode. In general, the conversion can be effected at a temperature in the range of about 120–250° C. At temperatures below this range, the process reaction rates are undesirably low. Higher temperatures are not necessary and are less desirable because they require higher pressures. For temperatures in the range specified, a reaction-zone pressure in the range of about 15 to 600 p.s.i.g. is required to maintain the reaction mixture in the liquid phase. The various reactions by which the conversion to the oxide takes place are complex and proceed by steps. The rate of reaction increases with temperature, and in general it is preferable to operate the continuous-feed type of reactor at temperatures above about 150° C., so as to maintain a comparatively low concentration of either $NO_3^-$ or reducing agent in the reactor. This will prevent accumulation of large amounts of mixed reactants, and feed solutions will react as quickly as they attain the reactor temperature.

In view of the foregoing it will be apparent to those skilled in the art that aqueous-soluble, nitrate-reducing compounds of the hydroxylated organic group as a whole are effective for the single-step conversion of aqueous fuel-metal nitrate solutions to fuel-metal dioxides at elevated temperatures and pressures. The following are additional examples of such compounds: aldehydes, such as formaldehyde, acetaldehyde, etc.; ketones, such as acetone, methyl-ethyl ketone, etc.; organic esters; ethers; carboxylic acids. From the standpoint of product purity, those hydroxylated organic compounds containing only oxygen, carbon, and hydrogen are preferred.

As indicated in Example III, above, my process also is effective for the single-step conversion of aqueous thorium nitrate solutions to thorium oxide. The term "fuel-metal" as used herein is intended to include thorium as well as plutonium and uranium.

What is claimed is:
1. A method for converting an aqueous solution of a nuclear fuel-metal nitrate selected from the group consisting of uranium, thorium, and plutonium nitrates to substantially anhydrous fuel-metal dioxide which is pelletizable without grinding, comprising the steps of
    (a) ading to said solution a reducing material selected from the group consisting of hydrazine and water-soluble, nitrate-reducing hydroxylated organic compounds consisting solely of hydrogen, oxygen, and carbon;
    (b) maintaining the resulting solution at an elevated temperature under pressure to form a slurry of substantially anhydrous fuel-metal dioxide; and
    (c) recovering said fuel-metal dioxide.

2. The method of claim 1 wherein said resulting solution is maintained at a temperature between about 120 and 250° C. and under a pressure between about 15 and 600 p.s.i.g.

3. The method of claim 1 wherein said reducing material is hydrazine and the addition of said hydrazine to said nitrate solution is conducted at a temperature above about 120° C.

4. The method of claim 1 wherein said material is a member of the group consisting of water-soluble alcohols, ethylene glycol, and sugar.

5. A method for converting an aqueous solution of at least two fuel-metal nitrates selected from the group consisting of uranium, thorium, and plutonium nitrates to a mixture of substantially anhydrous fuel-metal dioxides pelletizable without grinding, comprising the steps of
    (a) adding to said solution a reducing material selected from the group consisting of hydrazine and water-soluble, nitrate-reducing hydroxylated organic compounds consisting solely of hydrogen, oxygen, and carbon;
    (b) maintaining the resulting solution at an elevated temperature under pressure to form a slurry of substantially anhydrous fuel-metal dioxides; and
    (c) recovering the resulting mixture of fuel-metal dioxides.

6. The method of claim 5 wherein said resulting solution is maintained at a temperature between about 120 and 250° C. and under a pressure of between about 15 and 600 p.s.i.g.

7. The method of claim 5 wherein said reducing material is hydrazine and the addition of said hydrazine to said nitrate solution is conducted at a temperature above about 120° C.

8. The improved method of producing nuclear reactor fuel pellets of at least one substantially anhydrous fuel-metal dioxide selected from the class consisting of uranium, thorium, and plutonium dioxides comprising
    (a) adding to an aqueous solution of at least one fuel-metal nitrate selected from the class consisting of uranium, thorium, and plutonium nitrates a reducing material selected from the class consisting of hydrazine and water-soluble, nitrate-reducing hydroxylated organic compounds consisting solely of hydrogen, oxygen, and carbon;
    (b) maintaining the resulting solution at an elevated temperature under pressure to form a slurry of substantially anhydrous fuel-metal dioxide;
    (c) recovering said fuel-metal dioxide;
    (d) drying the recovered dioxide;
    (e) pelletizing the recovered dried dioxide; and
    (f) sintering the resulting pellets in a reducing atmosphere.

9. The method of claim 8 wherein said reducing material is a member of the group consisting of water-soluble alcohols, ethylene glycol, and sugar.

References Cited

UNITED STATES PATENTS

| | | | |
|---|---|---|---|
| 3,262,760 | 7/1966 | Morse et al. | 252—301.1 X |
| 3,287,279 | 11/1966 | Lyon | 252—301.1 |
| 3,666,426 | 5/1972 | Burkhardt | 252—301.1 X |
| 3,370,016 | 2/1968 | Briggs | 252—301.1 |

OTHER REFERENCES

Brcic et al., "On the Uranium-Hydrazine System," Nuc. Sci. Abs., vol. 18, No. 21, Nov. 15, 1964, p. 4971, No. 37111.

Shilov et al., "Heptavalent State of Transuranic Elements," Nuc. Sci. Abs., vol. 24, No. 19, Oct. 15, 1970, p. 3820, No. 38848.

CARL D. QUARFORTH, Primary Examiner

R. L. TATE, Assistant Examiner

U.S. Cl. X.R.

423—11, 251, 252, 261